(12) United States Patent
Orihashi et al.

(10) Patent No.: US 11,052,727 B2
(45) Date of Patent: Jul. 6, 2021

(54) VEHICLE AIR-CONDITIONING DEVICE

(71) Applicants: TOYOTA JIDOSHA KABUSHIKI KAISHA, Toyota (JP); DENSO CORPORATION, Kariya (JP)

(72) Inventors: Manabu Orihashi, Okazaki (JP); Takahito Nakamura, Kariya (JP); Koichi Ito, Handa (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 224 days.

(21) Appl. No.: 16/172,126

(22) Filed: Oct. 26, 2018

(65) Prior Publication Data

US 2019/0143788 A1 May 16, 2019

(30) Foreign Application Priority Data

Nov. 14, 2017 (JP) .............................. JP2017-219240

(51) Int. Cl.
*B60H 1/00* (2006.01)
*B60H 1/24* (2006.01)

(52) U.S. Cl.
CPC ..... *B60H 1/00871* (2013.01); *B60H 1/00742* (2013.01); *B60H 1/242* (2013.01);
(Continued)

(58) Field of Classification Search
CPC ................ B60H 1/00871; B60H 1/242; B60H 2001/002; B60H 1/00742; B60H 1/00285
See application file for complete search history.

(56) References Cited

U.S. PATENT DOCUMENTS

| 4,199,187 A * | 4/1980 | Kobayashi ............. B60H 1/246 296/24.41 |
| 4,259,896 A * | 4/1981 | Hayashi ................. B60H 1/246 297/180.14 |

(Continued)

FOREIGN PATENT DOCUMENTS

| JP | 05332609 A | * 12/1993 |
| JP | 06219137 A | * 8/1994 |

(Continued)

OTHER PUBLICATIONS

Onodera, JP 2003-094933A English machine translation, Apr. 3, 2003 (Year: 2003).*

(Continued)

*Primary Examiner* — Kenneth J Hansen
*Assistant Examiner* — Phillip Decker
(74) *Attorney, Agent, or Firm* — Oliff PLC

(57) ABSTRACT

In an instrument panel provided in a vehicle cabin front section, a face that projects into a vehicle cabin is formed with a T-shape in vehicle rear view. An air-conditioning unit of a vehicle air-conditioning device is provided at an inside of the instrument panel. In the vehicle air-conditioning device, a foot blower outlet provided on the instrument panel blows an air-conditioned airflow toward the feet of a front seat occupant, and an interior air intake provided on the instrument panel takes in air from inside the vehicle cabin to generate the air-conditioned airflow. The foot blower outlet is formed in a lower portion of a side wall at a vehicle width direction central portion of the instrument panel.

6 Claims, 2 Drawing Sheets

(52) U.S. Cl.
CPC .......... *B60H 1/00285* (2013.01); *B60H 1/246* (2013.01); *B60H 2001/002* (2013.01)

(56) References Cited

U.S. PATENT DOCUMENTS

| | | | | |
|---|---|---|---|---|
| 4,800,951 | A * | 1/1989 | Sakurai | B60H 1/00828 165/203 |
| 5,860,593 | A * | 1/1999 | Heinle | B60H 1/0075 165/204 |
| 6,454,178 | B1 * | 9/2002 | Fusco | B60H 1/00742 165/203 |
| 6,491,578 | B2 * | 12/2002 | Yoshinori | B60H 1/00007 165/203 |
| 6,705,672 | B2 * | 3/2004 | Shikata | B60H 1/00528 296/208 |
| 7,578,341 | B2 * | 8/2009 | Ichishi | B60H 1/00742 165/202 |
| 7,913,746 | B2 * | 3/2011 | Hirooka | B60H 1/242 165/42 |
| 8,079,405 | B2 * | 12/2011 | Shindoh | B60H 1/00671 165/42 |
| 8,118,354 | B2 * | 2/2012 | Lucas | B60N 2/3065 296/208 |
| 9,102,215 | B2 * | 8/2015 | Kumar | B60H 1/00842 |
| 9,266,406 | B2 * | 2/2016 | Morikawa | B60H 1/00864 |
| 9,457,639 | B2 * | 10/2016 | Wang | B60H 1/00742 |
| 9,616,850 | B2 * | 4/2017 | Geiss | B60S 1/023 |
| 2007/0132559 | A1 * | 6/2007 | Schleeh | B60R 21/01532 340/425.5 |
| 2008/0128107 | A1 * | 6/2008 | Yoshii | B60H 1/00378 165/42 |
| 2008/0248736 | A1 * | 10/2008 | Aoki | B60H 1/00742 454/75 |
| 2008/0295992 | A1 | 12/2008 | Shindoh | |
| 2009/0038774 | A1 * | 2/2009 | Ogiso | B60H 1/245 165/42 |
| 2010/0248608 | A1 * | 9/2010 | Belanger | B60H 1/249 454/159 |
| 2014/0346160 | A1 * | 11/2014 | Moench | H05B 1/0236 219/202 |
| 2016/0039389 | A1 * | 2/2016 | Kato | B60H 1/3414 454/127 |
| 2016/0144685 | A1 * | 5/2016 | Ochiai | B60H 1/00028 165/204 |
| 2016/0311292 | A1 * | 10/2016 | Park | B60H 1/00885 |
| 2019/0241043 | A1 * | 8/2019 | Ito | B60N 2/002 |

FOREIGN PATENT DOCUMENTS

| | | | | |
|---|---|---|---|---|
| JP | 2003094933 A | * | 4/2003 | |
| JP | 2005225377 A | * | 8/2005 | |
| JP | 2008-296685 A | | 12/2008 | |
| JP | 2009173161 A | * | 8/2009 | |
| JP | 2009274573 A | * | 11/2009 | |
| JP | 2010070173 A | * | 4/2010 | ......... B60H 1/00028 |
| JP | 2010-143374 A | | 7/2010 | |
| WO | WO-2017067847 A1 | * | 4/2017 | ......... B60H 1/3457 |

OTHER PUBLICATIONS

Kuwata, JP 2009-173161 A English machine translation, Aug. 6, 2009 (Year: 2009).*

* cited by examiner

VEHICLE AIR-CONDITIONING DEVICE

CROSS-REFERENCE TO RELATED APPLICATION

This application is based on and claims priority under 35 USC 119 from Japanese Patent Application No. 2017-219240 filed on Nov. 14, 2017 the disclosure of which is incorporated by reference herein.

BACKGROUND

Technical Field

The present disclosure relates to a vehicle air-conditioning device.

Related Art

Vehicle air-conditioning devices are known (see Japanese Patent Application Laid-Open (JP-A) Nos. 2010-143374 (Patent Document 1) and 2008-296685 (Patent Document 2)). For example, Patent Document 1 discloses a vehicle air-conditioning device in which an air-conditioning unit is disposed at an inside of an instrument panel. Briefly, in this device, a foot blower outlet is provided in front of a front seat occupant, and an airflow toward the feet of the front seat occupant is supplied from the foot blower outlet.

Recently, from such perspectives as securing space for the feet of a front seat occupant, instrument panels having a slim-line design in a vehicle vertical direction are being developed.

However, in cases in which an instrument panel has a slim-line design in the vehicle vertical direction, the distance from the foot blower outlet to the feet of the front seat occupant becomes greater when employing a configuration similar to that of the background art described above. There is thus room for improvement with respect to easy regulation of the temperature felt by the feet of the front seat occupant.

SUMMARY

In consideration of the above circumstances, an object of the present disclosure is to obtain a vehicle air-conditioning device that enables easy regulation of the temperature felt by the feet of a front seat occupant, even in cases in which an instrument panel has a slim-line design in the vehicle vertical direction.

A vehicle air-conditioning device according to a first aspect includes a main body, a foot blower outlet, and an interior air intake. The main body is provided at an inside of an instrument panel, the instrument panel being provided in a vehicle cabin front section such that a face of the instrument panel projecting into the vehicle cabin is formed with a T-shape in vehicle rear view by a first region extending along a vehicle width direction and a second region extending downward from a vehicle width direction central portion of the first region. The foot blower outlet is provided on the instrument panel and blows an air-conditioned airflow toward a foot of a front seat occupant. The interior air intake is provided on the instrument panel and takes in air from inside the vehicle cabin to generate the air-conditioned airflow. Moreover, the foot blower outlet is formed in a lower portion of a side wall of the second region.

According to the above configuration, in the instrument panel provided in the vehicle cabin front section, the face of the instrument panel projecting into the vehicle cabin is formed with a T-shape in vehicle rear view by the first region extending along the vehicle width direction, and the second region extending downward from the vehicle width direction central portion of the first region. This secures space for the feet of the front seat occupant. The main body of the vehicle air-conditioning device is provided at the inside of the instrument panel. In the vehicle air-conditioning device, the foot blower outlet provided on the instrument panel blows an air-conditioned airflow toward a foot of the front seat occupant, and the interior air intake that is provided on the instrument panel takes in air from inside the vehicle cabin to generate the air-conditioned airflow.

Note that the foot blower outlet is formed in the lower portion of the side wall of the second region of the instrument panel. The distance from the foot blower outlet to the foot of the front seat occupant can thus be made shorter, while still securing space for the feet of the front seat occupant. This thereby enables easy regulation of the temperature felt by the foot of the front seat occupant.

A vehicle air-conditioning device according to a second aspect is the first aspect, wherein the interior air intake is provided in a lower end portion of the instrument panel.

According to the above configuration, air in the vicinity of the feet of the front seat occupant, namely air that is at a temperature that the air-conditioned airflow has brought close to a target temperature, can be taken in through the interior air intake and employed for the air-conditioned airflow. This thereby improves heating and cooling efficiency.

A vehicle air-conditioning device according to a third aspect is either the first aspect or the second aspect, wherein the foot blower outlet includes a first foot blower outlet and a second foot blower outlet. The first foot blower outlet blows an air-conditioned airflow toward the foot positioned on a vehicle width direction inner side out of left and right feet of the front seat occupant. The second foot blower outlet blows an air-conditioned airflow toward the foot positioned on a vehicle width direction outer side out of left and right feet of the front seat occupant.

According to the above configuration, the first foot blower outlet blows an air-conditioned airflow toward the foot positioned on the vehicle width direction inner side out of the left and right feet of the front seat occupant. The second foot blower outlet blows an air-conditioned airflow toward the foot positioned on the vehicle width direction outer side out of the left and right feet of the front seat occupant. This thereby enables a good supply of air-conditioned airflows to both the left and right feet of the front seat occupant.

A vehicle air-conditioning device according to a fourth aspect is the third aspect, wherein the second foot blower outlet is set so as to be larger than the first foot blower outlet.

According to the above configuration, the second foot blower outlet that blows an air-conditioned airflow toward the more distant foot is set so as to be larger than the first foot blower outlet that blows an air-conditioned airflow toward the nearer foot. This thereby enables a stronger air-conditioned airflow to be easily supplied to the more distant foot.

A vehicle air-conditioning device according to a fifth aspect is either the third aspect or the fourth aspect, wherein a flow rate of the air-conditioned airflow blown from the second foot blower outlet is set so as to be greater than a flow rate of the air-conditioned airflow blown from the first foot blower outlet.

According to the above configuration, the flow rate of the air-conditioned airflow blown from the second foot blower outlet toward the more distant foot is set so as to be greater than the flow rate of the air-conditioned airflow blown from the first foot blower outlet toward the nearer foot. The temperatures felt by the left and right feet can thus be brought closer to one another.

A vehicle air-conditioning device according to a sixth aspect is any one out of the first aspect to the fifth aspect, further including a lower limb detector, an airflow direction adjuster, and an adjustment controller. The lower limb detector is disposed in the vehicle cabin front section and detects a position of a lower limb of the front seat occupant. The airflow direction adjuster adjusts a flow direction of the air-conditioned airflow blown from the foot blower outlet. The adjustment controller controls the airflow direction adjuster based on a detection result from the lower limb detector such that the flow direction of the air-conditioned airflow blown from the foot blower outlet is directed toward the lower limb of the front seat occupant.

According to the above configuration, the lower limb detector disposed in the vehicle cabin front section detects the position of the lower limb of the front seat occupant. Moreover, the airflow direction adjuster adjusts the direction of the air-conditioned airflow blown from the foot blower outlet. The adjustment controller accordingly controls the airflow direction adjuster based on the detection result of the lower limb detector, such that the flow direction of the air-conditioned airflow blown from the foot blower outlet is directed toward the lower limb of the front seat occupant. Accordingly, the flow direction of the air-conditioned airflow can be changed according to the position of the lower limb of the front seat occupant. This thereby enables easy regulation of the temperature felt by the feet of the front seat occupant.

A vehicle air-conditioning device according to a seventh aspect is any one out of the first aspect to the sixth aspect, further including a partitioning member that is provided between a lower end portion of a seat cushion of a front seat and a floor panel, and that is disposed so as to partition a lower space below and to the front and rear of the seat cushion into front and rear portions in the vehicle front-rear direction.

According to the above configuration, due to the partitioning member, the air-conditioned airflow blown from the foot blower outlet does not flow (or hardly flows) toward the rear seat, enabling the temperature of the feet of the front seat occupant to be made to approach the target temperature with ease.

A vehicle air-conditioning device according to an eighth aspect is the seventh aspect, wherein the partitioning member is provided between the lower end portion of the seat cushion of the front seat and the floor panel so as to be configured to open and close, and the vehicle air-conditioning device further includes a moving mechanism to open and close the partitioning member.

According to the above configuration, the partitioning member is provided between the lower end portion of the seat cushion of the front seat and the floor panel so as to be configured to open and close. The partitioning member is opened and closed by the moving mechanism. Opening the partitioning member enables the air-conditioned airflow blown from the foot blower outlet to be supplied toward the rear seat.

A vehicle air-conditioning device according to a ninth aspect is the eighth aspect, further including a temperature detector, a rear seat occupant detector, and an opening/closing controller. The temperature detector is disposed in the vehicle cabin front section and detects a temperature in the vicinity of the feet of the front seat occupant. The rear seat occupant detector is disposed further toward the vehicle rear than the front seat, and detects a rear seat occupant. The opening/closing controller controls the moving mechanism so as to place the partitioning member in an open state in cases in which a temperature measured by the temperature detector has been determined to have reached a preset reference temperature and a rear seat occupant has been detected by the rear seat occupant detector, and controls the moving mechanism so as to place the partitioning member in a closed state in all other cases.

According to the above configuration, the temperature detector disposed in the vehicle cabin front section detects the temperature in the vicinity of the feet of the front seat occupant, and the rear seat occupant detector disposed further toward the vehicle rear than the front seat detects a rear seat occupant. The opening/closing controller controls the moving mechanism so as to place the partitioning member in the open state in cases in which the temperature measured by the temperature detector has been determined to have reached the preset reference temperature and a rear seat occupant has been detected by the rear seat occupant detector, and the opening/closing controller controls the moving mechanism so as to place the partitioning member in the closed state in all other cases. This thereby enables the air-conditioned airflow to be supplied toward the rear seat after efficiently regulating the temperature in the vicinity of the feet of the front seat occupant.

As described above, the vehicle air-conditioning device of the present disclosure exhibits the excellent advantageous effect of enabling easy regulation of the temperature felt by the feet of a front seat occupant, even in cases in which an instrument panel has a slim-line design in the vehicle vertical direction.

DETAILED DESCRIPTION

Figure 1:
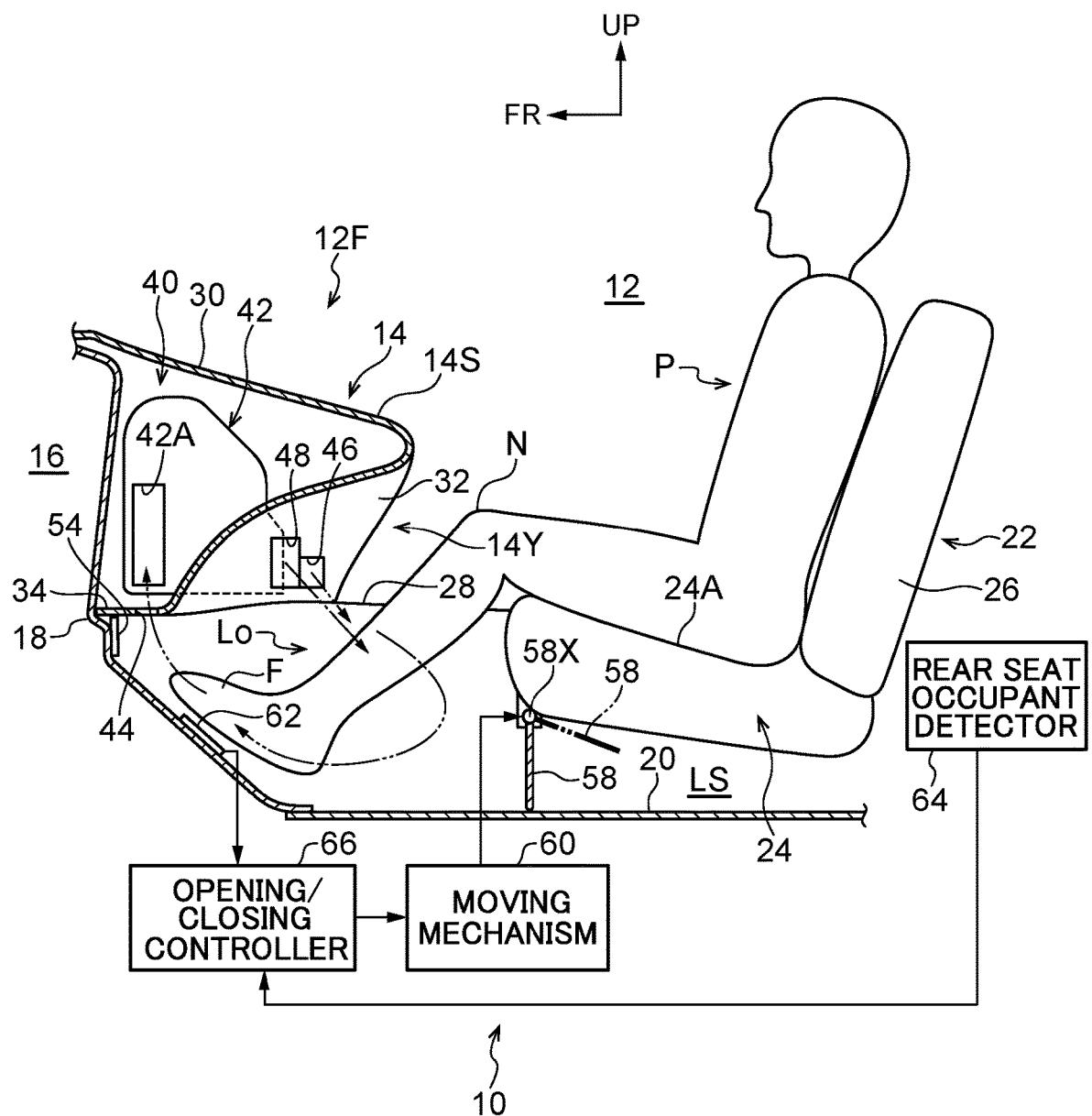
FIG. 1 is a side cross-section illustrating part of a vehicle installed with a vehicle air-conditioning device according to an exemplary embodiment of the present disclosure, corresponding to an enlarged cross-section sectioned along line 1-1 in FIG. 2B.
Figure 2A:
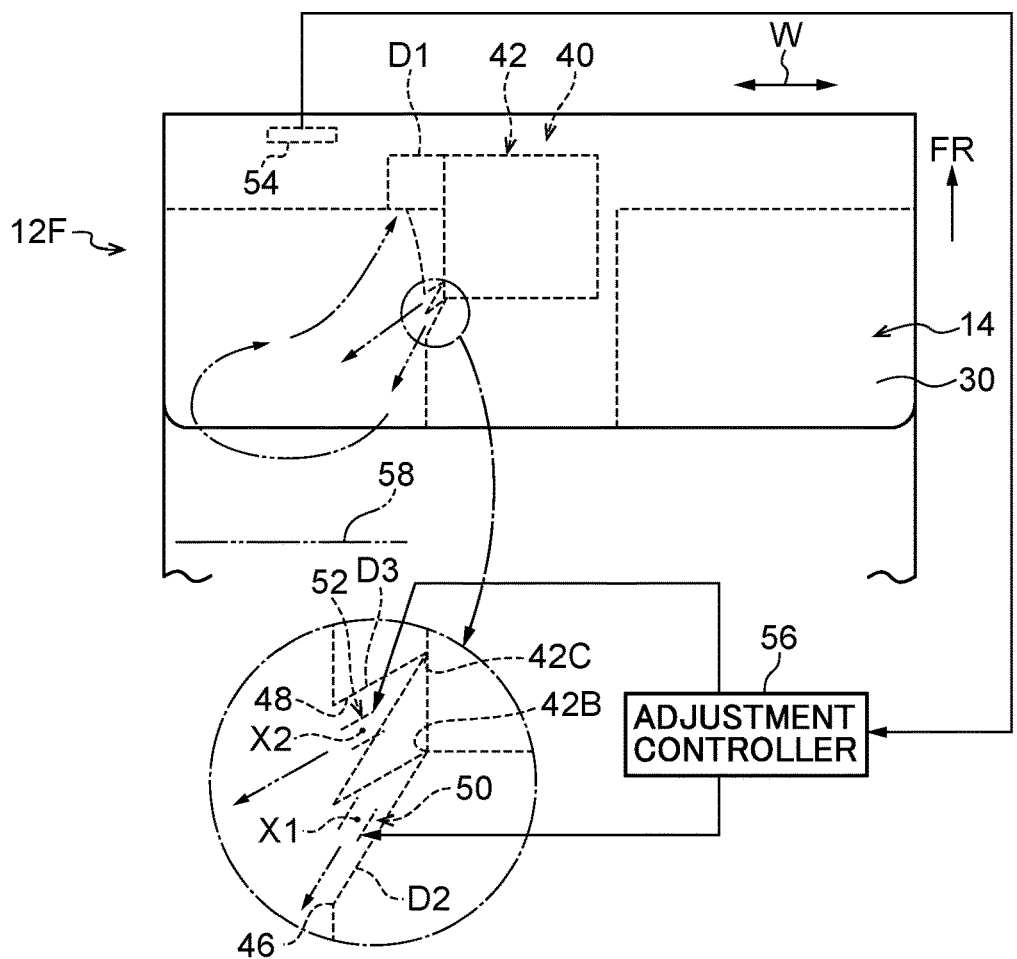
FIG. 2A is a scaled-down schematic plan view illustrating a vehicle cabin front section illustrated in FIG. 1.
Figure 2B:
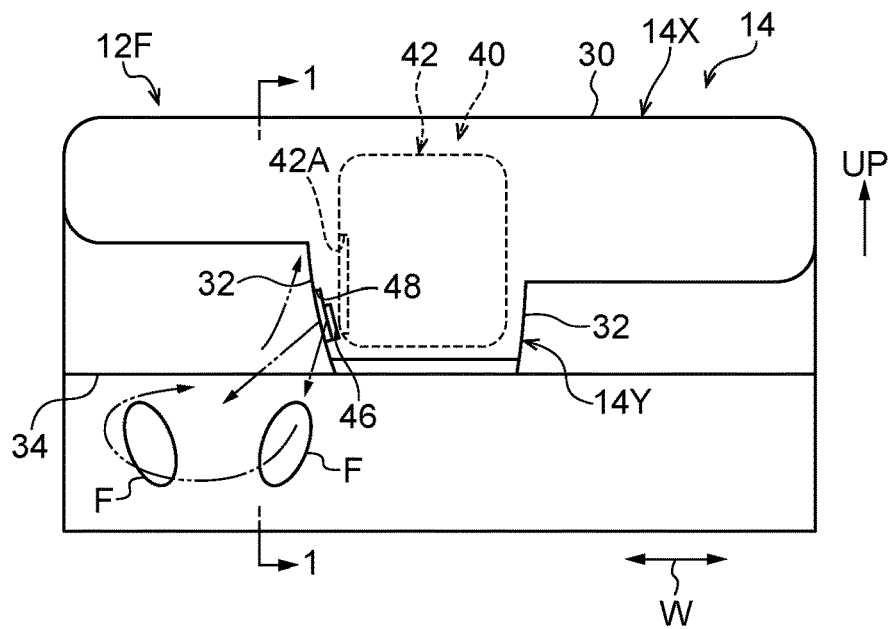
FIG. 2B is a scaled-down schematic rear view illustrating the vehicle cabin front section illustrated in FIG. 1, in a state viewed from within the vehicle cabin.

Explanation follows regarding a vehicle air-conditioning device according to an exemplary embodiment of the present disclosure, with reference to FIG. 1, FIG. 2A, and FIG. 2B. In the drawings, arrow FR indicates a vehicle front side, arrow UP indicates a vehicle upper side, and arrow W indicates a vehicle width direction, as appropriate.

Configuration of Exemplary Embodiment

FIG. 1 is a side cross-section (a drawing corresponding to an enlarged cross-section sectioned along line 1-1 in FIG. 2B) illustrating part of a vehicle 10 installed with a vehicle air-conditioning device 40 according to the present exemplary embodiment. The vehicle air-conditioning device 40 is capable of both heating and cooling. FIG. 2A is a scaled-down schematic plan view of a vehicle cabin front section 12F illustrated in FIG. 1, and FIG. 2B is a scaled-down schematic rear view of the vehicle cabin front section 12F illustrated in FIG. 1, in a state viewed from within the vehicle cabin.

As illustrated in the drawings, the vehicle cabin front section 12F is provided with an instrument panel 14. As illustrated in FIG. 1, the instrument panel 14 is disposed at an upper side and at the vehicle rear of a dash panel 18 that separates a vehicle cabin 12 from a vehicle front section 16. A lower end portion of the dash panel 18 is joined to a front end portion of a floor panel 20. The floor panel 20 configures a lower face of the vehicle cabin 12. An upper end portion of the dash panel 18 is joined to a cowl, not illustrated in the drawings. The cowl supports a lower end portion of a front windshield pane, not illustrated in the drawings. The front windshield pane configures a front face of an upper section of the vehicle cabin 12, and the lower end portion of the front windshield pane is disposed at an upper end portion of the instrument panel 14.

A front seat 22, serving as a front vehicle seat, is provided at the vehicle rear of the instrument panel 14. The front seat 22 of the present exemplary embodiment is a front passenger seat if on the left side of a front section of the vehicle cabin 12, and is a driver's seat if on the right side of the front section of the vehicle cabin 12. A center console 28 is disposed at a vehicle width direction central portion of the front section of the vehicle cabin 12. A seat front-rear direction of the front seat 22 is aligned with the vehicle front-rear direction, and a seat width direction of the front seat 22 is aligned with the vehicle width direction. The front seat 22 is configured including a seat cushion 24, a seatback 26 coupled at a lower end to a rear end of the seat cushion 24, and a headrest, not illustrated in the drawings, provided at an upper end of the seatback 26. Note that a structural section that supports the seat cushion 24 on the floor panel 20 is not illustrated in the drawings. An upper face of the seat cushion 24 is configured by a seat portion 24A on which an occupant sits, and a slide mechanism, not illustrated in the drawings, enables the seat cushion 24 to slide in the vehicle front-rear direction. In the drawings, a front seat occupant is labeled P, the lower limbs of the front seat occupant are labeled Lo, and a region downward from the ankles of the front seat occupant P is labeled F.

As illustrated in FIG. 2A and FIG. 2B, the instrument panel 14 is configured as an interior panel extending along the vehicle width direction. An elongated instrument panel reinforcement (not illustrated in the drawings) is installed running along the vehicle width direction inside an upper (and vehicle front side) portion of the instrument panel 14. The instrument panel 14 is attached to the instrument panel reinforcement at plural locations. The instrument panel reinforcement is a metal pipe member, and the two length direction ends of the instrument panel reinforcement are respectively fixed to a pair of upright front pillars (left and right framework members), not illustrated in the drawings, provided to vehicle body side portions on the left and right.

As illustrated in FIG. 2B, as viewed from the rear of the vehicle, a face of the instrument panel 14 that projects into the vehicle cabin is formed in a T-shape by a first region 14X extending along the vehicle width direction, and a second region 14Y extending downward from a vehicle width direction central portion of the first region 14X. The instrument panel 14 is configured including an upper wall 30 configuring an upper face of the instrument panel 14, side walls 32 configuring side faces of the second region 14Y, and a bottom wall 34 configuring a lower end portion.

A protruding portion 14S, substantially in the shape of a V opening toward the vehicle front as viewed in side cross-section from the vehicle width direction outer side, such as in FIG. 1, is configured on each vehicle width direction side of the instrument panel 14. A height position of a protrusion leading end of each protruding portion 14S is set further toward the vehicle upper side than the knees N of the front seat occupant P seated in the front seat 22. The instrument panel 14 of the present exemplary embodiment has a slim-line structure, with the protruding portions 14S having a small vertical direction dimension, thereby configuring a structure capable of securing ample space for the feet of the front seat occupant P.

An air-conditioning unit 42, serving as a main body of the vehicle air-conditioning device 40, is provided inside (and at a vehicle front side of) the instrument panel 14. The air-conditioning unit 42 is a heating and ventilating air-conditioning (HVAC) unit, and is a unit that supplies temperature-regulated air into the vehicle cabin 12. Note that the basic configuration of the air-conditioning unit 42 is, for example, known from the aforementioned Patent Document 1 (JP-A No. 2010-143374), and detailed explanation thereof is omitted. A case of the air-conditioning unit 42 is disposed at the inside of the vehicle cabin relative to the dash panel 18, and is attached to the dash panel 18 using fasteners (nuts and bolts) or the like, not illustrated in the drawings.

The vehicle air-conditioning device 40 includes foot blower outlets 46, 48 that are provided in the instrument panel 14 and that blow an air-conditioned airflow toward the feet of the front seat occupant P. The vehicle air-conditioning device 40 further includes an interior air intake 44 that is provided in the instrument panel 14 and that takes in air from inside the vehicle cabin 12 in order to generate the air-conditioned airflow. Note that in FIG. 1, the direction of the air-conditioned airflow is indicated by double-dotted dashed arrows (similar applies in FIG. 2A and FIG. 2B).

The interior air intake 44 is provided in the bottom wall 34 configuring the lower end portion of the instrument panel 14, and is connected to an interior air entry port 42A of the air-conditioning unit 42 via a duct D1 (see FIG. 2A). Note that the duct D1 (see FIG. 2A) is omitted from illustration in FIG. 1 in the interests of simplicity. The interior air intake 44 is set in the vicinity of the right foot of the front seat occupant P (out of the left and right feet, the foot positioned on the vehicle width direction inner side), substantially alongside the air-conditioning unit 42. The interior air entry port 42A is formed in a side of the air-conditioning unit 42. The foot blower outlets 46, 48 are formed in a lower portion of the side wall 32 of the second region 14Y of the instrument panel 14, and are set at positions lower than the knees N of the front seat occupant P. Although the foot blower outlets 46, 48 would be barely visible when viewed from the perspective illustrated in FIG. 2B, this being a schematic rear view, the foot blower outlets 46, 48 on the left side of the second region 14Y in FIG. 2B are exaggerated for convenience. Moreover, as illustrated in FIG. 2A, the foot blower outlets 46, 48 are set such that the air-conditioned airflow from the foot blower outlets 46, 48 flows in an oblique downward and rearward direction toward the vehicle width direction outer side (see FIG. 1). The foot blower outlets 46, 48 are connected to air outlets 42B, 42C of the air-conditioning unit 42 via ducts D2 and D3. Note that as an example, the air outlet 42B and the air outlet 42C are set at mutually overlapping positions in plan view; however, there is no limitation to such a positional relationship.

Regarding the foot blower outlets 46, 48 illustrated in FIG. 1, in the present exemplary embodiment, the foot blower outlet 46 configures a first foot blower outlet 46 provided so as to blow an air-conditioned airflow toward the foot of the front seat occupant P that, out of the left and right feet of the front seat occupant P, is positioned on the vehicle width direction inner side, and the foot blower outlet 48 configures a second foot blower outlet 48 provided so as to blow an air-conditioned airflow toward the foot of the front seat occupant P that, out of the left and right feet of the front seat occupant P, is positioned on the vehicle width direction outer side. The second foot blower outlet 48 is set so as to be larger than the first foot blower outlet 46. Moreover, the flow rate of the air-conditioned airflow blown from the second foot blower outlet 48 is set so as to be greater than the flow rate of the air-conditioned airflow blown from the first foot blower outlet 46. Note that in the following explanation, the first foot blower outlet 46 and the second foot blower outlet 48 are referred to simply as the "foot blower outlets 46, 48" when being referred to collectively.

As schematically illustrated in the enlarged portion of FIG. 2A, the vehicle air-conditioning device 40 includes airflow direction adjusters 50, 52 that adjust the direction of the air-conditioned airflow blown from each of the foot blower outlets 46, 48. As an example, the airflow direction adjusters 50, 52 are tube-shaped, and are capable of adjusting the airflow direction by pivoting about axes X1, X2 that run in the vehicle vertical direction. The airflow direction adjusters 50, 52 are connected to an adjustment controller 56 (illustrated in block form in the drawings).

As illustrated in FIG. 1, a lower limb detector 54 that detects the position of the lower limbs Lo of the front seat occupant P (the position of the left foot and the position of the right foot of the front seat occupant P in the present exemplary embodiment) is disposed at a lower portion of the dash panel 18 of the vehicle cabin front section 12F. The lower limb detector 54 is, for example, configured including a camera that captures images of the lower limbs Lo of the front seat occupant P and the vicinity thereof, and an image sensor that processes the images of the lower limbs Lo of the front seat occupant P and the vicinity thereof captured by the camera to compute the positions of the lower limbs Lo of the front seat occupant P, and that outputs computation result data. Note that the lower limb detector 54 may be configured including an infrared sensor instead of the configuration described above. Moreover, the lower limb detector 54 may be integrally provided to the air-conditioning unit 42. As illustrated in FIG. 2A, the lower limb detector 54 is connected to the adjustment controller 56. The adjustment controller 56 controls the first airflow direction adjuster 50 based on the detection results of the lower limb detector 54 in order to direct the air-conditioned airflow blown from the first foot blower outlet 46 toward the right foot out of the lower limbs Lo of the front seat occupant P (the foot positioned on the vehicle width direction inner side out of the left and right feet) (see FIG. 1 for all elements). The adjustment controller 56 also controls the second airflow direction adjuster 52 based on detection results of the lower limb detector 54, in order to direct the air-conditioned airflow blown from the second foot blower outlet 48 toward the left foot out of the lower limbs Lo of the front seat occupant P (the foot positioned on the vehicle width direction outer side out of the left and right feet) (see FIG. 1 for all elements).

Moreover, as illustrated in FIG. 1, a partitioning plate 58 is disposed between a lower end portion of the seat cushion 24 of the front seat 22 and the floor panel 20. The partitioning plate 58 serves as a partitioning member that partitions a lower space LS, below and to the front and rear of the seat cushion 24, into front and rear portions in the vehicle front-rear direction. The partitioning plate 58 is supported by a shaft 58X that is provided at an upper end portion of the partitioning plate 58 and that extends along the vehicle width direction such that the partitioning plate 58 is capable of pivoting toward the seat cushion 24. The partitioning plate 58 is provided between the lower end portion of the seat cushion 24 of the front seat 22 and the floor panel 20 so as to be configured to open and close. Note that in FIG. 1, the position of the partitioning plate 58 when in an open state is illustrated by a double-dotted dashed line. The vehicle air-conditioning device 40 includes a moving mechanism 60 (illustrated in block form in the drawings) to open and close the partitioning plate 58. The moving mechanism 60 includes a drive motor and a drive force transmission mechanism that transmits drive force generated by the drive motor to rotate the shaft 58X. The moving mechanism 60 is capable of changing the degree of opening (in other words, a pivot angle with respect to a vertically descending reference orientation) of the partitioning plate 58.

A temperature detector 62 that detects the temperature in the vicinity of the feet of the front seat occupant P is disposed below the dash panel 18 of the vehicle cabin front section 12F. The temperature detector 62 is configured by a temperature sensor. A rear seat occupant detector 64 (illustrated in block form in the drawings) that detects a rear seat occupant is disposed at the vehicle rear side of the front seat 22. For example, the rear seat occupant detector 64 configured including an electrical contact-type seat sensor provided to the rear seat such that electrical contact is made when a load acts on the seat face of the rear seat due to an occupant sitting on a seat cushion of the rear seat. Alternatively, instead of the configuration described above, the rear seat occupant detector 64 may be configured including a camera that captures images of the rear seat, and an image sensor that processes images of the rear seat captured by the camera in order to compute whether or not a rear seat occupant is present, and that outputs computation result data. Alternatively, the rear seat occupant detector 64 may be configured including an infrared sensor.

The temperature detector 62 and the rear seat occupant detector 64 are connected to an opening/closing controller 66 (illustrated in block form in the drawings). The opening/closing controller 66 controls the moving mechanism 60 so as to place the partitioning plate 58 in an open state in cases in which the temperature measured by the temperature detector 62 is determined to have reached a preset reference temperature and the rear seat occupant detector 64 has detected a rear seat occupant, and controls the moving mechanism 60 so as to place the partitioning plate 58 in a closed state in all other cases.

Operation and Advantageous Effects of the Exemplary Embodiment

Next, explanation follows regarding operation and advantageous effects of the exemplary embodiment described above.

As illustrated in FIG. 2B, as viewed from the vehicle rear, a face of the instrument panel 14 provided in the vehicle cabin front section 12F that projects into the vehicle cabin is formed in a T-shape by the first region 14X extending along the vehicle width direction, and the second region 14Y extending downward from the vehicle width direction central portion of the first region 14X. Space for the feet of the front seat occupant P illustrated in FIG. 1 is secured. The air-conditioning unit 42 of the vehicle air-conditioning device 40 is provided at the inside of the instrument panel 14. The vehicle air-conditioning device 40 blows air-conditioned airflows toward the feet of the front seat occupant P through the foot blower outlets 46, 48 provided in the instrument panel 14, and takes in air with which to generate the air-conditioned airflow from inside the vehicle cabin 12, through the interior air intake 44 provided in the instrument panel 14.

Note that the foot blower outlets 46, 48 are formed in the lower portion of the side wall 32 of the second region 14Y of the instrument panel 14. The distance from the foot blower outlets 46, 48 to the feet of the front seat occupant P can thus be made shorter, while still securing space for the feet of the front seat occupant P. This thereby enables easy regulation of the temperature felt by the front seat occupant P.

To explain further with the aid of a comparative structure, in a comparative structure in which, for example, foot blower outlets are provided in an instrument panel in front of a front seat occupant, the distance from the foot blower outlets to the feet of the front seat occupant becomes greater in cases in which the instrument panel has a slim-line design in the vehicle vertical direction. Accordingly, such a comparative structure experiences more air-conditioning loss as a result of diffusion of the air-conditioned airflow (airflow from the foot blower outlets), resulting in a longer warming-up period before the temperature of the feet reaches a target temperature. Moreover, in this comparative structure, the speed of the air-conditioned airflow in the vicinity of the feet of the front seat occupant is slower than in cases in which the instrument panel does not have a slim-line design in the vehicle vertical direction. It is thus conceivable that when the comparative structure is used for heating in winter, for example, the feet of the front seat occupant may not feel as warm during the warming-up period. By contrast, the present exemplary embodiment is capable of reducing the distance from the foot blower outlets 46, 48 to the feet of the front seat occupant P, thereby enabling the issues encountered by the comparative structure to be addressed.

Moreover, in the present exemplary embodiment, the interior air intake 44 is provided in the lower end portion of the instrument panel 14. This thereby enables air in the vicinity of the feet of the front seat occupant P, namely air that is at a temperature close that the air-conditioned airflow has brought close to the target temperature, to be taken in through the interior air intake 44 and employed for the air-conditioned airflow. This thereby improves heating and cooling efficiency.

Moreover, in the present exemplary embodiment, the vehicle air-conditioning device 40 includes the first foot blower outlet 46 and the second foot blower outlet 48 as the foot blower outlets 46, 48 illustrated in FIG. 2A and FIG. 2B. The first foot blower outlet 46 blows an air-conditioned airflow toward the foot positioned on the vehicle width direction inner side out of the left and right feet of the front seat occupant P (see FIG. 1). The second foot blower outlet 48 blows an air-conditioned airflow toward the foot positioned on the vehicle width direction outer side out of the left and right feet of the front seat occupant P (see FIG. 1). This thereby enables a good supply of air-conditioned airflows to both the left and right feet of the front seat occupant P.

Moreover, in the present exemplary embodiment, the second foot blower outlet 48 that blows an air-conditioned airflow toward the more distant foot is set so as to be larger than the first foot blower outlet 46 that blows an air-conditioned airflow toward the nearer foot (see FIG. 1). This thereby enables a stronger air-conditioned airflow to be easily supplied to the more distant foot.

Moreover, in the present exemplary embodiment, the flow rate of the air-conditioned airflow blown from the second foot blower outlet 48 toward the more distant foot is set so as to be greater than the flow rate of the air-conditioned airflow blown from the first foot blower outlet 46 toward the nearer foot. The temperatures felt in the vicinity of the left and right feet can thus be brought closer to one another.

Moreover, in the present exemplary embodiment, the lower limb detector 54 disposed in the vehicle cabin front section 12F illustrated in FIG. 1 detects the positions of the lower limbs Lo of the front seat occupant P. Moreover, the airflow direction adjusters 50, 52 illustrated in FIG. 2A adjust the directions of the air-conditioned airflows blown from the foot blower outlets 46, 48. The adjustment controller 56 accordingly controls the airflow direction adjusters 50, 52 based on the detection results of the lower limb detector 54, such that the flow directions of the air-conditioned airflows blown from the foot blower outlets 46, 48 are directed toward the lower limbs Lo of the front seat occupant P (see FIG. 1 for all elements). Moreover, the flow directions of the air-conditioned airflows can be changed according to the position of the lower limbs Lo of the front seat occupant P, even when the seat cushion 24 illustrated in FIG. 1 is moved, or the posture of the front seat occupant P changes. This thereby enables easy regulation of the temperature felt by the feet of the front seat occupant P.

Moreover, the present exemplary embodiment includes the partitioning plate 58 provided between the lower end portion of the seat cushion 24 of the front seat 22 and the floor panel 20 and disposed so as to partition the lower space LS, below and to the front and rear of the seat cushion 24, into front and rear portions in the vehicle front-rear direction. Due to the partitioning plate 58, the air-conditioned airflows blown from the foot blower outlets 46, 48 do not flow (or hardly flow) toward the rear seat, allowing the air-conditioned airflow (for example warm air when heating) to pool in the vicinity of the feet of the front seat occupant P. The lower limbs Lo of the front seat occupant P can thus be enveloped by the air-conditioned airflows, enabling the temperature of the feet of the front seat occupant P to be made to approach the target temperature with ease.

Moreover, in the present exemplary embodiment, the partitioning plate 58 is provided between the lower end portion of the seat cushion 24 of the front seat 22 and the floor panel 20 so as to be configured to open and close. The partitioning plate 58 is opened and closed by the moving mechanism 60. Opening the partitioning plate 58 enables the air-conditioned airflow blown from the foot blower outlets 46, 48 to be supplied toward the rear seat.

Moreover, in the present exemplary embodiment, the temperature detector 62 disposed in the vehicle cabin front section 12F detects the temperature in the vicinity of the feet of the front seat occupant P, and the rear seat occupant detector 64 disposed further toward the vehicle rear than the front seat 22 detects a rear seat occupant. The opening/closing controller 66 controls the moving mechanism 60 so as to place the partitioning plate 58 in the open state in cases in which the temperature measured by the temperature detector 62 has been determined to have reached the preset reference temperature and a rear seat occupant has been detected by the rear seat occupant detector 64, and the opening/closing controller 66 controls the moving mechanism 60 so as to place the partitioning plate 58 in the closed state in all other cases. This thereby enables the air-conditioned airflow blown from the foot blower outlets 46, 48 to be supplied toward the rear seat after efficiently regulating the temperature in the vicinity of the feet of the front seat occupant P. An air-conditioning effect is thus obtained for the rear seat as well.

As described above, the vehicle air-conditioning device 40 of the present exemplary embodiment enables easy regulation of the temperature felt by the feet of the front seat occupant P, even when the instrument panel 14 has a slim-line design in the vehicle vertical direction.

Supplementary Explanation of the Exemplary Embodiment

Note that in the exemplary embodiment described above, the interior air intake 44 is provided in the bottom wall 34 at the lower end portion of the instrument panel 14. Although such a configuration is preferable, configuration may be made in which, for example, an interior air intake is formed at a location other than a lower end portion of an instrument panel (14), such as in an upper wall (30) of the instrument panel (14).

Moreover, in the exemplary embodiment described above, the first foot blower outlet 46 and the second foot blower outlet 48 are provided as the foot blower outlets 46, 48. Although such a configuration is preferable, configuration may be made in which, for example, a single foot blower outlet, or three or more foot blower outlets, are formed.

Moreover, in the exemplary embodiment described above, the second foot blower outlet 48 is set so as to be larger than the first foot blower outlet 46. Although such a configuration is preferable, configuration may be made in which, for example, a first foot blower outlet and a second foot blower outlet are set so as to be the same size as each other.

Moreover, in the exemplary embodiment described above, the flow rate of the air-conditioned airflow blown from the second foot blower outlet 48 is set so as to be greater than the flow rate of the air-conditioned airflow blown from the first foot blower outlet 46. Although such a configuration is preferable, configuration may be made in which, for example, the flow rate of the air-conditioned airflow blown from a first foot blower outlet is set so as to be the same as the flow rate of the air-conditioned airflow blown from a second foot blower outlet.

Moreover, when heating, the temperature of the air-conditioned airflow blown from a second foot blower outlet (48) may be set so as to be higher than the temperature of the air-conditioned airflow blown from a first foot blower outlet (46). Moreover, when cooling, the temperature of air-conditioned airflow blown from the second foot blower outlet (48) may be set so as to be lower than the temperature of the air-conditioned airflow blown from the first foot blower outlet (46).

Moreover, the exemplary embodiment described above is provided with the lower limb detector 54, the airflow direction adjusters 50, 52, and the adjustment controller 56 illustrated in FIG. 2A. Although such a configuration is preferable, configuration may be made in which these components are not provided.

Moreover, as a partitioning member, the exemplary embodiment described above is provided with the partitioning plate 58 illustrated in FIG. 1. However, a partitioning member may be configured by a partitioning member other than the partitioning plate 58, for example a partitioning curtain or a shutter, attached to a lower end portion of a seat cushion (24) of a front seat (22), provided between the lower end portion of the seat cushion (24) and a floor panel (20),
and disposed such that the partitioning curtain or shutter partitions the lower space LS, below and to the front and rear of the seat cushion (24), into front and rear portions in the vehicle front-rear direction. Such a partitioning curtain may be capable of being rolled up.

Moreover, in the exemplary embodiment described above, a configuration in which the partitioning plate 58 is provided as a partitioning member is preferable. However, configuration may be made in which the partitioning plate 58 is not provided. Moreover, in the exemplary embodiment described above, the moving mechanism 60 is provided to open and close the partitioning plate 58 that serves as the partitioning member. However, configuration may be made in which the moving mechanism 60 is not provided.

Moreover, the exemplary embodiment described above is provided with the temperature detector 62, the rear seat occupant detector 64, and the opening/closing controller 66. Although such a configuration is preferable, configuration may be made in which these components are not provided.

Moreover, in the exemplary embodiment described above, explanation has been given regarding a configuration in which air-conditioning is performed on the front passenger seat side. However, similar air-conditioning may be applied on the driver's seat side.

Note that the exemplary embodiment and the plural modified examples described above may be combined as appropriate.

Explanation has been given regarding an example of the present disclosure. However, the present disclosure is not limited by the above, and obviously various modifications may be implemented within a range not departing from the spirit of the present disclosure.

What is claimed is:

1. A vehicle air-conditioning device comprising:
a main body that is provided at an inside of an instrument panel, the instrument panel being provided in a vehicle cabin front section such that a face of the instrument panel projecting into the vehicle cabin is formed with a T-shape in vehicle rear view by a first region extending along a vehicle width direction and a second region extending downward from a vehicle width direction central portion of the first region;
a foot blower outlet that is provided on the instrument panel and that blows an air-conditioned airflow toward a foot of a front seat occupant;
an interior air intake that is provided on the instrument panel and that takes in air from inside the vehicle cabin to generate the air-conditioned airflow, wherein:
the foot blower outlet is formed in a lower portion of a side wall of the second region,
the foot blower outlet includes:
a first foot blower outlet that is configured to blow an air-conditioned airflow toward the foot positioned on a vehicle width direction inner side out of left and right feet of the front seat occupant; and
a second foot blower outlet that is configured to blow an air-conditioned airflow toward the foot positioned on a vehicle width direction outer side out of left and right feet of the front seat occupant, and
an opening of the second foot blower outlet is larger than an opening of the first foot blower outlet;
a lower limb detector that detects a first position of the foot positioned on the vehicle width direction inner side and a second position of the foot positioned on a vehicle width direction outer side;
an airflow direction adjuster that adjusts a flow direction of the air-conditioned airflow; and an adjustment controller that is configured to control the airflow direction adjuster in order to:
  adjust a direction in which the first foot blower outlet blows the air-conditioned airflow based on the first position detected by the lower limb detector so that the air-conditioned airflow is blown from the first foot blower outlet toward the foot positioned on the vehicle width direction inner side, and
  adjust a direction in which the second foot blower outlet blows the air-conditioned airflow based on the second position detected by the lower limb detector so that the air-conditioned airflow is blown from the second foot blower outlet toward the foot positioned on a vehicle width direction outer side.

2. The vehicle air-conditioning device of claim 1, wherein the interior air intake is provided in a lower end portion of the instrument panel.

3. The vehicle air-conditioning device of claim 1, wherein a flow rate of the air-conditioned airflow blown from the second foot blower outlet is set so as to be greater than a flow rate of the air-conditioned airflow blown from the first foot blower outlet.

4. The vehicle air-conditioning device of claim 1, further comprising a partitioning member that is provided between a lower end portion of a seat cushion of a front seat and a floor panel, and that is disposed so as to partition a lower space below and to the front and rear of the seat cushion into front and rear portions in the vehicle front-rear direction.

5. The vehicle air-conditioning device of claim 4, wherein:
  the partitioning member is provided between the lower end portion of the seat cushion of the front seat and the floor panel so as to be configured to open and close; and
  the vehicle air-conditioning device further comprises a moving mechanism to open and close the partitioning member.

6. The vehicle air-conditioning device of claim 5, further comprising:
  a temperature detector that is disposed in the vehicle cabin front section and that detects a temperature at the feet of the front seat occupant;
  a rear seat occupant detector that is disposed further toward the vehicle rear than the front seat, and that detects a rear seat occupant; and
  an opening/closing controller that controls the moving mechanism so as to place the partitioning member in an open state in cases in which a temperature measured by the temperature detector has been determined to have reached a preset reference temperature and a rear seat occupant has been detected by the rear seat occupant detector, and that controls the moving mechanism so as to place the partitioning member in a closed state in all other cases.

* * * * *